B. FORD.
STORAGE BATTERY JAR.
APPLICATION FILED DEC. 19, 1912.
1,167,810.
Patented Jan. 11, 1916.
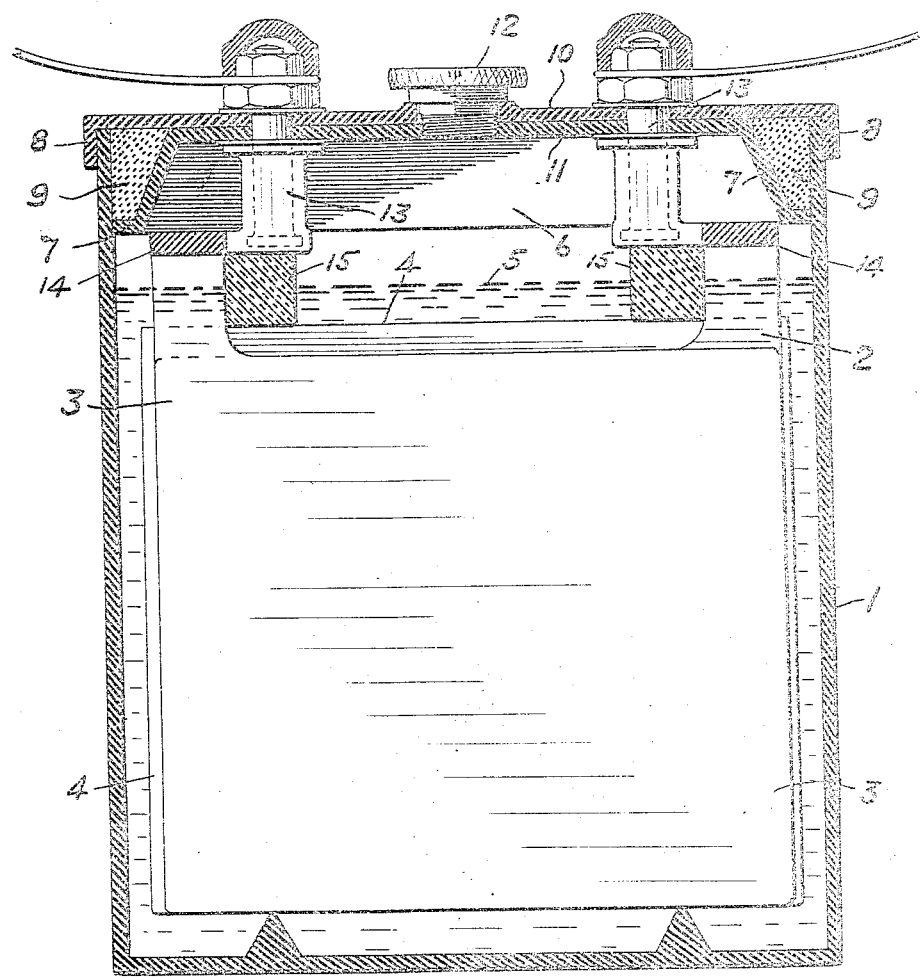
WITNESSES:
INVENTOR
Bruce Ford
BY
Augustus B. Stoughton.
ATTORNEY

UNITED STATES PATENT OFFICE.

BRUCE FORD, OF PHILADELPHIA, PENNSYLVANIA.

STORAGE-BATTERY JAR.

1,167,816.  Specification of Letters Patent.  Patented Jan. 11, 1916.

Application filed December 18, 1912. Serial No. 737,384.

*To all whom it may concern:*

Be it known that I, BRUCE FORD, a citizen of the United States, and a resident of Philadelphia, in the county of Philadelphia and State of Pennsylvania, have invented a certain new and useful Storage-Battery Jar, of which the following is a specification.

The principal objects of the present inventon are to increase the available space for elements within the jar and to firmly hold the upper portions of the jar against bulging and the like.

The invention will be claimed at the end hereof, but will be first described in connection with the embodiment of it chosen from other embodiments, for illustration in the accompanying drawings, which is a sectional view.

In the drawings 1 is a jar or container for the elements 2 and 3; the separators 4, and the electrolyte 5. The cover 6 is provided with a marginal channel 7 and with a flange 8. The flange 8 overlies the side walls of the jar and thus incloses, surrounds and supports their upper portions. The channel 7 receives a sealing compound 9. As shown the cover is made in two parts: the upper part 10 is provided with the flange 8 and the lower part 11 is provided with the outwardly inclined wall terminating in an extension parallel to the part itself and these walls constitute the channel.

12, is a properly vented filling plug.

13 are the terminal connections which extend from the straps 14 that connect the plates through the cover and constitute the binding posts.

15 are insulating bars which serve to hold down the separators 4. The concavity formed within and under the cover affords head room or space so that without changing the exterior dimensions of the jar, the height of the plates may be considerably increased.

In automobile and other work the space for the jars is limited so that the described construction of jar is important, because it permits of an increase in the size of the plates and this increase is of material importance in increasing the effective portion of the battery.

What I claim is:

1. A storage battery closure comprising the combination of a jar, and a cover concave on one side and marginally provided with a sealing compound channel terminating at the inner face of the jar and with a marginal flange surrounding the side wall of the jar, substantially as described.

2. A storage battery closure comprising the combination of a jar, a two-part cover of which one part is provided with a marginal flange surrounding the exterior of the top of the wall of the jar and of which the other part is provided with a marginal channel terminating at the inner face of the wall of the jar and a sealing compound arranged in said channel and against said wall, substantially as described.

In testimony whereof I have hereunto signed my name.

BRUCE FORD.

Witnesses:
  CLAYTON E. CASSEL,
  FRANK E. FRENCH.